(12) United States Patent
Kato

(10) Patent No.: US 12,212,178 B2
(45) Date of Patent: Jan. 28, 2025

(54) BATTERY CONTROL SYSTEM FOR VEHICLE

(71) Applicant: Isuzu Motors Limited, Yokohama (JP)

(72) Inventor: Kota Kato, Fujisawa (JP)

(73) Assignee: Isuzu Motors Limited, Yokohama (JP)

(*) Notice: Subject to any disclaimer, the term of this patent is extended or adjusted under 35 U.S.C. 154(b) by 30 days.

(21) Appl. No.: 18/124,594

(22) Filed: Mar. 22, 2023

(65) Prior Publication Data

US 2023/0307936 A1    Sep. 28, 2023

(30) Foreign Application Priority Data

Mar. 23, 2022   (JP) ................................ 2022-047467

(51) Int. Cl.
| | | |
|---|---|---|
| *B60L 50/60* | (2019.01) | |
| *B60L 58/18* | (2019.01) | |
| *H01M 10/44* | (2006.01) | |
| *H01M 10/48* | (2006.01) | |
| *H02J 7/00* | (2006.01) | |

(52) U.S. Cl.
CPC .......... *H02J 7/00714* (2020.01); *B60L 58/18* (2019.02); *B60L 2240/545* (2013.01); *B60L 2240/547* (2013.01); *B60L 2240/549* (2013.01)

(58) Field of Classification Search
CPC .................. H02J 7/00714; B60L 58/18; B60L 2240/545; B60L 2240/547; B60L 2240/549; B60L 2200/36; B60L 58/12; B60L 3/0046; B60L 58/10; B60L 2240/54; Y02E 60/10
See application file for complete search history.

(56) References Cited

U.S. PATENT DOCUMENTS

| | | | |
|---|---|---|---|
| 2014/0176073 A1* | 6/2014 | Shrinkle | B60L 58/25 320/126 |
| 2015/0360579 A1* | 12/2015 | Hashimoto | B60L 58/25 307/10.1 |
| 2022/0194262 A1 | 6/2022 | Shimonagata | |

FOREIGN PATENT DOCUMENTS

JP        2020-167864        10/2020

* cited by examiner

*Primary Examiner* — Elim Ortiz

(57) ABSTRACT

A attainable output power comparison judgment section calculates a total attainable output power of a battery module using an upper limit current value of a battery pack for each of all connection patterns of a battery connection/disconnection section that are capable of being established between a plurality of battery packs and a load, and judges whether or not a high-output pattern exhibiting a total attainable output power higher than a total attainable output power of a present connection pattern exists. The battery connection/disconnection control section changes the battery connection/disconnection section from the present connection pattern to the high-output pattern when the attainable output power comparison judgment section judges that the high-output pattern exists.

4 Claims, 3 Drawing Sheets

BATTERY CONTROL SYSTEM FOR VEHICLE

CROSS REFERENCE TO RELATED APPLICATIONS

This application claims the benefit of priority of Japanese Patent Application No. 2022-047467 filed on Mar. 23, 2022, the contents of which are incorporated herein by reference in their entirety.

TECHNICAL FIELD

The present disclosure relates to a battery control system for a vehicle.

BACKGROUND ART

Patent Literature 1 (hereinafter, referred to as "PTL" 1) discloses an electric vehicle including a first battery pack and a second battery pack that constitute a battery module, and a driving motor. The first battery pack and the second battery pack are connected in parallel, and a first contactor and a second contactor are interposed between, on one hand, the first battery pack and the second battery pack and, on the other hand, the driving motor.

CITATION LIST

Patent Literature

PTL 1
Japanese Patent Application Laid-Open No. 2020-167864

SUMMARY OF INVENTION

Technical Problem

Battery packs have operating temperatures range suitable for the battery packs to be used. Use of a battery pack at a temperature higher than an operating temperature range promotes degradation of the battery pack. Therefore, reducing the amount of current flowing through a high-temperature battery pack (the current value of the battery pack) and suppressing the temperature rise of the battery pack is effective for protecting the battery pack. For example, the correspondence between, on one hand, the temperature and the voltage value of the battery pack and, on the other hand, the upper limit current value effective for protecting the battery pack is obtained in advance, temperatures and voltage values of the battery pack in use are sequentially detected, an upper limit current value is determined using the detected temperatures and the voltage values, and the current value of the battery pack is controlled to be equal to or lower than the upper limit current value, whereby deterioration of the battery pack can be suppressed.

When a plurality of battery packs constituting a battery module are connected in parallel to a load as described in PTL 1, the equal amount of current flows through each of the battery packs (the current value is equal between the battery packs), and therefore, the upper limit current value in the case of limiting the current values of the battery packs is a minimum upper limit current value among the upper limit current values individually determined for the respective battery packs. Therefore, there is a possibility that the total power that can be outputted from the battery module (hereinafter, referred to as "total attainable output power") at a high temperature is significantly limited.

Therefore, the present disclosure aims to provide a battery control system capable of suppressing a decrease in the total attainable output power at a high temperature while protecting a battery pack in a vehicle including a plurality of battery packs connected in parallel to a load.

Solution to Problem

In order to achieve the above object, the present disclosure is a battery control system for a vehicle in which a battery module including a plurality of battery packs is mounted and the plurality of battery packs are connected in parallel to a load, and includes: a battery connection/disconnection section, an upper limit current calculation section, a current control section, a attainable output power comparison judgment section, and a battery connection/disconnection control section.

The battery connection/disconnection section is interposed between the battery module and the load and is capable of connecting and disconnecting each of the plurality of battery packs individually to and from the load. The upper limit current calculation section calculates an upper limit current value of the battery pack using a temperature and a voltage value of the battery pack. The current control section controls a current value of the battery pack to a current value equal to or lower than the upper limit current value.

In a first aspect of the present disclosure, the attainable output power comparison judgment section calculates a total attainable output power of the battery module using the upper limit current value of the battery pack for each of all connection patterns of the battery connection/disconnection section that are capable of being established between the plurality of battery packs and the load, and judges whether or not a high-output pattern exhibiting a total attainable output power higher than a total attainable output power of a present connection pattern exists. The battery connection/disconnection control section changes the battery connection/disconnection section from the present connection pattern to the high-output pattern when the attainable output power comparison judgment section judges that the high-output pattern exists.

A second aspect of the present disclosure is the battery control system according to the first aspect, in which when a plurality of the high-output patterns exist, the battery connection/disconnection control section changes the connection pattern of the battery connection/disconnection section to a highest-output pattern exhibiting a highest total attainable output power.

A third aspect of the present disclosure is the battery control system according to the first or second aspect, in which the battery connection/disconnection control section changes the connection pattern of the battery connection/disconnection section only when a number of connections of the plurality of battery packs becomes less than the number of connections of the present connection pattern and a part of the plurality of battery packs is to be disconnected from the present connection pattern.

In a fourth aspect of the present disclosure, the attainable output power comparison judgment section configured to calculate a total attainable output power of the battery module using the upper limit current value of the battery pack for a present connection pattern of the battery connection/disconnection section that is established between the plurality of battery packs and the load and for a connection pattern of the battery connection/disconnection section resulting from disconnection of any one of the plurality of battery packs from the present connection pattern, and judge whether or not a high-output pattern exhibiting a total attainable output power higher than a total attainable output power of the present connection pattern exists. When the attainable output power comparison judgment section judges that the high-output pattern exists, the battery connection/disconnection control section changes the connection pattern of the battery connection/disconnection section to the high-output pattern.

Advantageous Effects of Invention

According to a battery control system of the present disclosure, it is possible to suppress a decrease in the total attainable output power at a high temperature while protecting a battery pack in a vehicle including a plurality of battery packs connected in parallel to a load.

DESCRIPTION OF EMBODIMENTS

Hereinafter, one embodiment of the present invention will be described with reference to the drawings. A battery control system of the present embodiment is disposed in a vehicle such as an electric vehicle or a hybrid vehicle.

Figure 1:
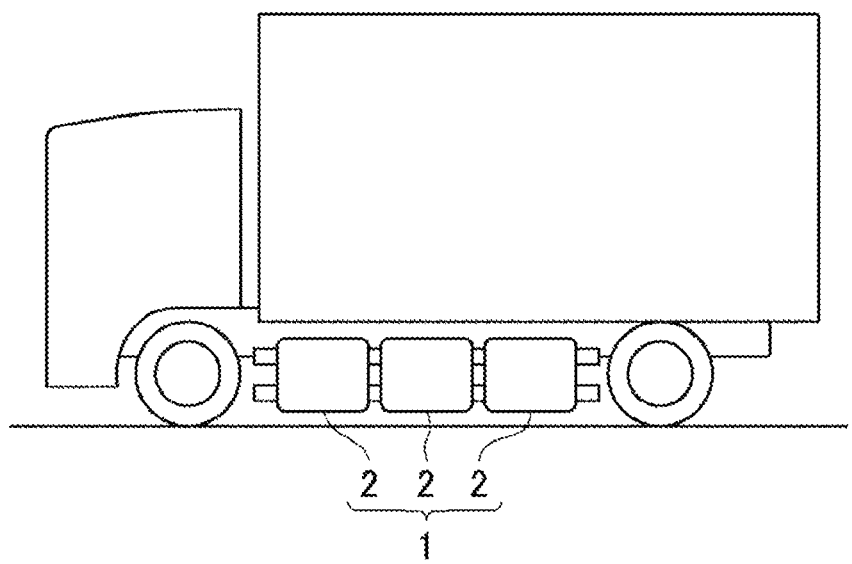
FIG. 1 is a side view schematically illustrating a vehicle in which a battery module according to one embodiment of the present disclosure is mounted.

As illustrated in FIG. 1, a plurality of (three in the present embodiment) battery packs 2 are mounted in a vehicle. The plurality of battery packs 2 constitute battery module 1. Although FIG. 1 illustrates an example in which battery module 1 is mounted in a truck, the vehicle is not limited to the truck.

Figure 2:
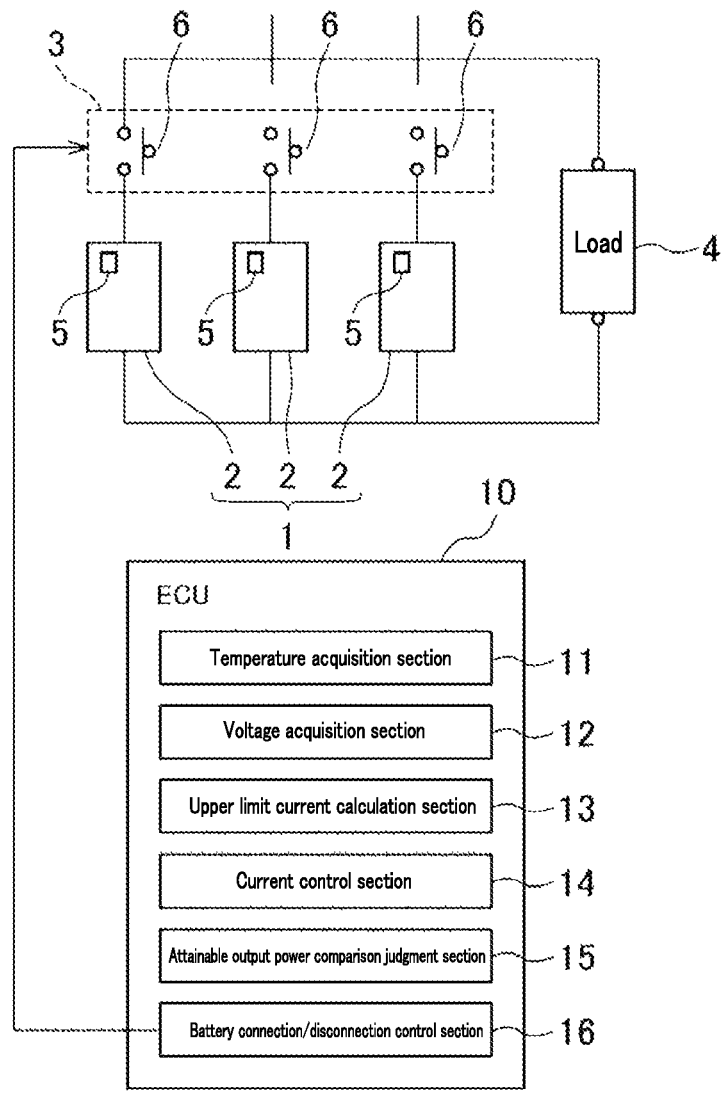
FIG. 2 is a block diagram illustrating a battery control system of the embodiment of FIG. 1.

As illustrated in FIG. 2, the battery control system includes battery module 1, battery connection/disconnection section 3, load 4, and battery control apparatus 10.

The plurality of battery packs 2 are connected in parallel to load 4. Each of battery packs 2 is provided with temperature sensor 5 for detecting the temperature of battery pack 2. Load 4 includes a driving motor (not illustrated) that propels the vehicle. The driving motor is driven by electric power supplied by battery module 1.

Battery connection/disconnection section 3 is composed of the same number of contactors 6 as battery packs 2, and is interposed between battery module 1 and load 4. The ON/OFF states of contactors 6 connect or disconnect the plurality of battery packs 2 individually to and from load 4. In the present embodiment, a state in which all battery packs 2 are connected to load 4 (a state in which all contactors 6 are in the ON state) will be described as a standard connection pattern (a normal state) of battery connection/disconnection section 3.

Battery control apparatus 10 is, for example, an Electronic Control Unit (ECU), and includes a Central Processing Unit (CPU), a Read Only Memory (ROM), a Random Access Memory (RAM), an input/output circuit, and the like. Battery control apparatus 10 functions as temperature acquisition section 11, voltage acquisition section 12, upper limit current calculation section 13, current control section 14, attainable output power comparison judgment section 15, and battery connection/disconnection control section 16 by executing control programs stored in advance.

Temperature acquisition section 11 acquires the temperatures of battery packs 2 sequentially from temperature sensors 5. Voltage acquisition section 12 sequentially acquires, from a voltage sensor (not illustrated), voltages (voltage values of battery packs 2) between terminals of battery packs 2.

Battery control apparatus 10 stores upper limit current value information (for example, a map or the like) indicating a correspondence between the temperatures, the voltage values, and the upper limit current values of battery packs 2. The term "upper limit current value" means an upper limit current value effective for protection of battery pack 2 and the like, and when the voltage value is constant, the upper limit current value decreases as the temperature increases. There is an operating temperature range suitable for battery packs 2 to be used, and when the temperature becomes higher than the operating temperature range, the upper limit current value is significantly reduced. The upper limit current value information is obtained in advance by simulation or the like and stored in battery control apparatus 10.

Upper limit current calculation section 13 calculates the individual upper limit current values of battery packs 2 using the temperatures of battery packs 2 acquired by temperature acquisition section 11, the voltage values of battery packs 2 acquired by voltage acquisition section 12, and the upper limit current value information.

Current control section 14 controls the current values of battery packs 2 such that the current values are equal to or lower than the upper limit current values. Since battery packs 2 are connected in parallel, a total current value of current flowing through battery module 1 is evenly distributed to battery packs 2, and the current values of respective battery packs 2 are equal to one another. Current control section 14 controls the total current value such that a current equal to or lower than the lowest upper limit current value among the upper limit current values of battery packs 2 connected in parallel flows through battery packs 2. Therefore, when battery pack 2 having an upper limit current value smaller than those of other battery packs 2 because of the high temperature is connected, the upper limit current value of high-temperature battery pack 2 becomes a bottleneck. Accordingly, there is a possibility that the total attainable output power from battery module 1 (the total attainable output power from battery packs 2 connected in parallel) is significantly reduced.

Attainable output power comparison judgment section 15 calculates the attainable output power of each battery pack 2 using the upper limit current value and the voltage value of each battery pack 2, calculates the total attainable output power of battery module 1 for each of all connection patterns (including the present connection pattern) of battery connection/disconnection section 3 that can be established between the plurality of battery packs 2 and load 4, and judges whether or not a high-output pattern exhibiting a total attainable output power higher than that of the present connection pattern exists. The connection patterns of the present embodiment include a total of seven patterns: a standard connection pattern (one) connecting all three battery packs 2; two-pack connection patterns (three) connecting any combination of two among three battery packs 2; and single-connection patterns (three) only connecting any one battery pack 2. The total attainable output power for each pattern is calculated and compared with that of the present connection pattern.

When attainable output power comparison judgment section 15 judges that a high-output pattern exists, battery connection/disconnection control section 16 changes battery connection/disconnection section 3 from the present connection pattern to a high-output pattern. The number of connections of battery packs 2 may increase, decrease, or remain unchanged as a result of the change to the high-output pattern.

When a plurality of high-output patterns exist, the connection pattern of battery connection/disconnection section 3 is changed to the highest-output pattern exhibiting the highest total attainable output power. Note that battery connection/disconnection control section 16 may change the connection pattern of battery connection/disconnection section 3 only when the number of connections of battery packs 2 becomes less than the present connection pattern and a part of battery packs 2 is to be disconnected from the present connection pattern. By adding such a restriction, it is possible to exclude connection to battery pack 2 whose connection is restricted or prohibited, for example, when there is battery pack 2 whose connection is restricted or prohibited by control other than the present control.

Next, a current control process executed by battery control apparatus 10 and a connection/disconnection control process for connection/disconnection of battery pack 2 will be described with reference to the flowcharts of FIGS. 3 and 4. While electric power is supplied from battery module 1 to load 4, battery control apparatus 10 repeatedly performs the current control process and the connection/disconnection control process of battery packs 2. In the following, a description will be given of a case in which the present connection pattern of battery connection/disconnection section 3 is the standard connection pattern (connection pattern in which all three battery packs 2 are connected), but the present connection pattern may be other than the standard connection pattern.

Figure 3:
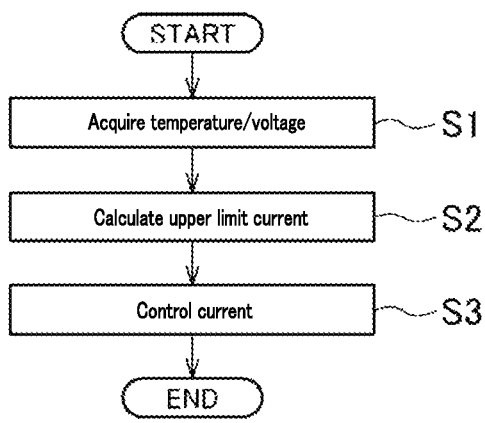
FIG. 3 is a flowchart illustrating a current control process.

In the current control process, as illustrated in FIG. 3, the temperatures and voltage values of three battery packs 2 are acquired, (step S1), and the upper limit current value of each of battery packs 2 is calculated individually using the acquired temperature and voltage value of battery pack 2 and the upper limit current value information (step S2).

After the upper limit current values of three battery packs 2 are calculated, the total current value of battery module 1 is controlled such that a current equal to or less than the lowest upper limit current value among the upper limit current values flows through battery packs 2.

Figure 4:
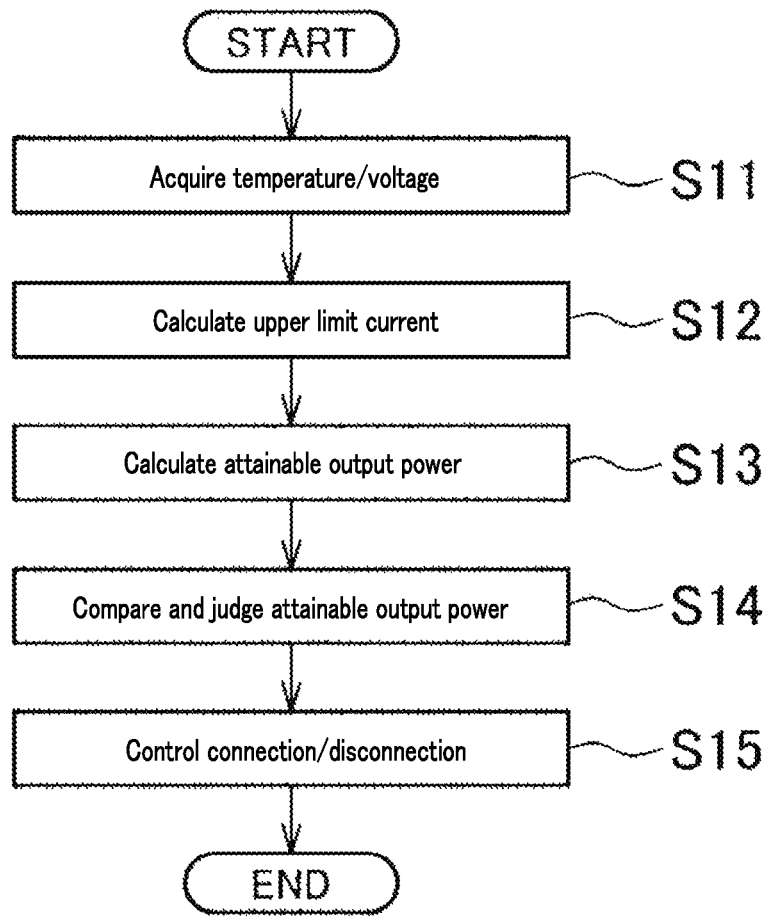
FIG. 4 is a flowchart illustrating a connection/disconnection control process of a battery pack.

In the connection/disconnection control process, as illustrated in FIG. 4, the temperatures and voltage values of three battery packs 2 are acquired, (step S11), and the upper limit current value of each of battery packs 2 is calculated individually using the acquired temperature and voltage value of battery pack 2 and the upper limit current value information (step S12).

After the upper limit current values of three battery packs 2 are calculated, the attainable output power of each of three battery packs 2 is calculated using the upper limit current value and the voltage value of battery pack 2 (step S13).

Next, for each of all the connection patterns (seven connection patterns) of battery connection/disconnection section 3 that can be established between three battery packs 2 and load 4, the total attainable output power from battery module 1 is calculated, and it is judged whether or not a high-output pattern exhibiting a total attainable output power higher than that of the present connection pattern exists (step S14).

When it is judged that the high-output pattern exists, battery connection/disconnection section 3 is changed from the present connection pattern to the high-output pattern (step S15). Further, when a plurality of high-output patterns exist, the connection pattern of battery connection/disconnection section 3 is changed to the highest-output pattern exhibiting the highest total attainable output power. For example, when the total attainable output power of a connection pattern resulting from disconnection of battery pack 2 among three battery packs 2 which has the highest temperature is the highest, battery pack 2 having the highest temperature is disconnected.

In the present embodiment, the total attainable output power of battery module 1 is calculated for each of all the connection patterns of battery connection/disconnection section 3 that can be established between the plurality of battery packs 2 and load 4. It is judged whether or not a high-output pattern exhibiting a total attainable output power higher than that of the present connection pattern exists. When it is judged that the high-output pattern exists, battery connection/disconnection section 3 is changed from the present connection pattern to the high-output pattern. Therefore, even when battery pack 2 having an upper limit current value smaller than those of other battery packs 2 because of the high temperature is connected and the upper limit current value of this high-temperature battery pack 2 is a bottleneck, it is possible to suppress a decrease in the total attainable output power from battery module 1.

In addition, when a plurality of high-output patterns exist, the connection pattern of battery connection/disconnection section 3 is changed to the highest-output pattern exhibiting the highest total attainable output power. Thus, a reduction width of the total attainable output power can be minimized.

Next, a variation of the present disclosure will be described. This variation differs from the above-described embodiment in the process of attainable output power comparison judgment section 15.

Attainable output power comparison judgment section 15 of the variation calculates the total attainable output power of battery module 1 for the present connection pattern of battery connection/disconnection section 3 established between the plurality of battery packs 2 and load 4 and for a connection pattern of battery connection/disconnection section 3 resulting from disconnection of any one battery pack 2 from the present connection pattern, and judges whether or not a high-output pattern exhibiting a total attainable output power higher than that of the present connection pattern exists. Since the number of connection patterns to be judged is smaller than that in the above-described embodiment, the process can be simplified.

Although the present disclosure has been described based on the above-described embodiments, the present invention is not limited to the contents of the above-described embodiments and can be modified as appropriate without departing from the scope of the present disclosure. That is, it is needless to say that all other embodiments, examples, operation techniques, and the like made by a person skilled in the art or the like based on this embodiment are included in the scope of the present disclosure.

For example, the above embodiment has been described in relation to an example in which three battery packs 2 constitute battery module 1, and three (all) battery packs 2 are connected in parallel to load 4 in the normal state. However, the number of battery packs 2 constituting battery module 1 is not limited to the above, and the battery module only need to include a plurality of battery packs. In addition, some of battery packs 2 may be connected to load 4 in the normal state.

INDUSTRIAL APPLICABILITY

The present disclosure is applicable to a vehicle including a plurality of battery packs connected in parallel to a load.

What is claimed is:

1. A battery control system for a vehicle in which a battery module including a plurality of battery packs is mounted and the plurality of battery packs are connected in parallel to a load, the battery control system comprising:
    a battery connection and disconnection section interposed between the battery module and the load and capable of connecting and disconnecting each of the plurality of battery packs individually to and from the load;
    an upper limit current calculation section configured to, for each battery pack of the plurality of battery packs, individually calculate an upper limit current value of said each battery pack using a temperature sensed for said each battery pack individually and a voltage value of said each battery pack;
    a current control section configured to control a current value of said each battery pack to a current value equal to or less than the upper limit current value;
    an attainable output power comparison judgment section configured to calculate a total attainable output power of the battery module using the upper limit current value of said each battery pack for each of all connection patterns of the battery connection and disconnection section that are capable of being established between the plurality of battery packs and the load, and judge whether or not a high-output pattern exhibiting a total attainable output power higher than a total attainable output power of a present connection pattern exists; and
    a battery connection and disconnection control section configured to change a connection pattern of the battery connection and disconnection section to the high-output pattern when the attainable output power comparison judgment section judges that the high-output pattern exists.

2. The battery control system for the vehicle according to claim 1, wherein
    when a plurality of the high-output patterns exist, the battery connection and disconnection control section changes the connection pattern of the battery connection and disconnection section to a highest-output pattern exhibiting a highest total attainable output power.

3. The battery control system for the vehicle according to claim 1, wherein
    the battery connection and disconnection control section changes the connection pattern of the battery connection and disconnection section only when a number of connections of the plurality of battery packs becomes less than the number of connections of the present connection pattern and a part of the plurality of battery packs is to be disconnected from the present connection pattern.

4. A battery control system for a vehicle in which a battery module including a plurality of battery packs is mounted and the plurality of battery packs are connected in parallel to a load, the battery control system comprising:
    a battery connection and disconnection section interposed between the battery module and the load and capable of connecting and disconnecting each of the plurality of battery packs individually to and from the load;
    an upper limit current calculation section configured to, for each battery pack of the plurality of battery packs, individually calculate an upper limit current value of said each battery pack using a temperature sensed for said each battery pack individually and a voltage value of said each battery pack;
    a current control section configured to control a current value of said each battery pack to a current value equal to or less than the upper limit current value;
    an attainable output power comparison judgment section configured to calculate a total attainable output power of the battery module using the upper limit current value of said each battery pack for a present connection pattern of the battery connection and disconnection section that is established between the plurality of battery packs and the load and for a connection pattern of the battery connection and disconnection section resulting from disconnection of any one of the plurality of battery packs from the present connection pattern, and judge whether or not a high-output pattern exhibiting a total attainable output power higher than a total attainable output power of the present connection pattern exists; and
    a battery connection and disconnection control section configured to change a connection pattern of the battery connection and disconnection section to the high-output pattern when the attainable output power comparison judgment section judges that the high-output pattern exists.

* * * * *